March 10, 1970 H. G. STRATMAN 3,500,248

LOW FREQUENCY MODULATION NETWORK

Filed March 8, 1967 2 Sheets-Sheet 1

INVENTOR.

HARDIN G. STRATMAN

BY Hill Sherman Meroni Gross & Simpson ATTORNEYS

March 10, 1970 H. G. STRATMAN 3,500,248

LOW FREQUENCY MODULATION NETWORK

Filed March 8, 1967 2 Sheets-Sheet 2

INVENTOR.

HARDIN G. STRATMAN

BY Hill, Sherman, Meroni, Gross & Simpson ATTORNEYS

United States Patent Office 3,500,248

Patented Mar. 10, 1970

3,500,248

LOW FREQUENCY MODULATION NETWORK

Hardin G. Stratman, Quincy, Ill., assignor to Gates Radio Company, Quincy, Ill., a corporation of Illinois

Filed Mar. 8, 1967, Ser. No. 621,605
**Int. Cl. H03c *3/00***
U.S. Cl. 332—23 10 Claims

ABSTRACT OF THE DISCLOSURE

An FM exciter having an audio driver circuit connected in a push-pull manner to two high frequency oscillators, each of said oscillators being preset to a center frequency, such that the difference frequency between the oscillators is the desired sub-carrier frequency, and wherein the push-pull driver circuit modulates the two oscillators, one in a positive direction for increasing the frequency thereof, and the other in a negative direction for decreasing the frequency thereof, and wherein the output of the two modulators are combined in a mixer network for generating sum and difference frequencies, and wherein means are provided to recover the difference frequency and utilize that signal as the desired modulated sub-carrier signal.

BACKGROUND OF THE INVENTION

Field of the invention

The field of art to which this invention pertains is an FM exciter, particularly an FM exciter having means for modulating one or more sub-carrier signals.

SUMMARY

An important feature of this invention is the provision for an improved system for modulating a low frequency sub-carrier signal.

Another feature of the present invention is the provision for an improved low frequency modulation system wherein the frequency stability of the modulated signal is substantially unaffected by changes in temperature or in other environmental characteristics ambient the modulated signal source.

It is also an object of this invention to provide a low frequency modulation system utilizing the difference signal between two preset high frequency oscillators to generate a stable low frequency modulated signal source.

It is another object of this invention to provide a pair of high frequency oscillator networks having a difference frequency equal to the desired modulated frequency signal and being connected in a push-pull manner wherein an information signal raises the frequency of one oscillator and lowers the frequency of the other.

It is an additional object of this invention to provide an FM exciter having an audio input driver circuit connected in a push-pull manner to a pair of high frequency oscillators, each of said oscillators being preset at a given high frequency wherein the difference between the frequencies of said oscillators is the desired sub-carrier signal, and wherein the output of the oscillators is coupled to a signal mixer for generating sum and difference modulated components, and wherein a low pass filter is utilized to pass the selected difference frequency sub-carrier signal.

Other and further objects of this invention will be apparent to those skilled in this art from the following detailed description and the annexed sheets of drawings which show a preferred embodiment of the invention.

DESCRIPTION OF THE PREFERRED EMBODIMENT

Figure 1:
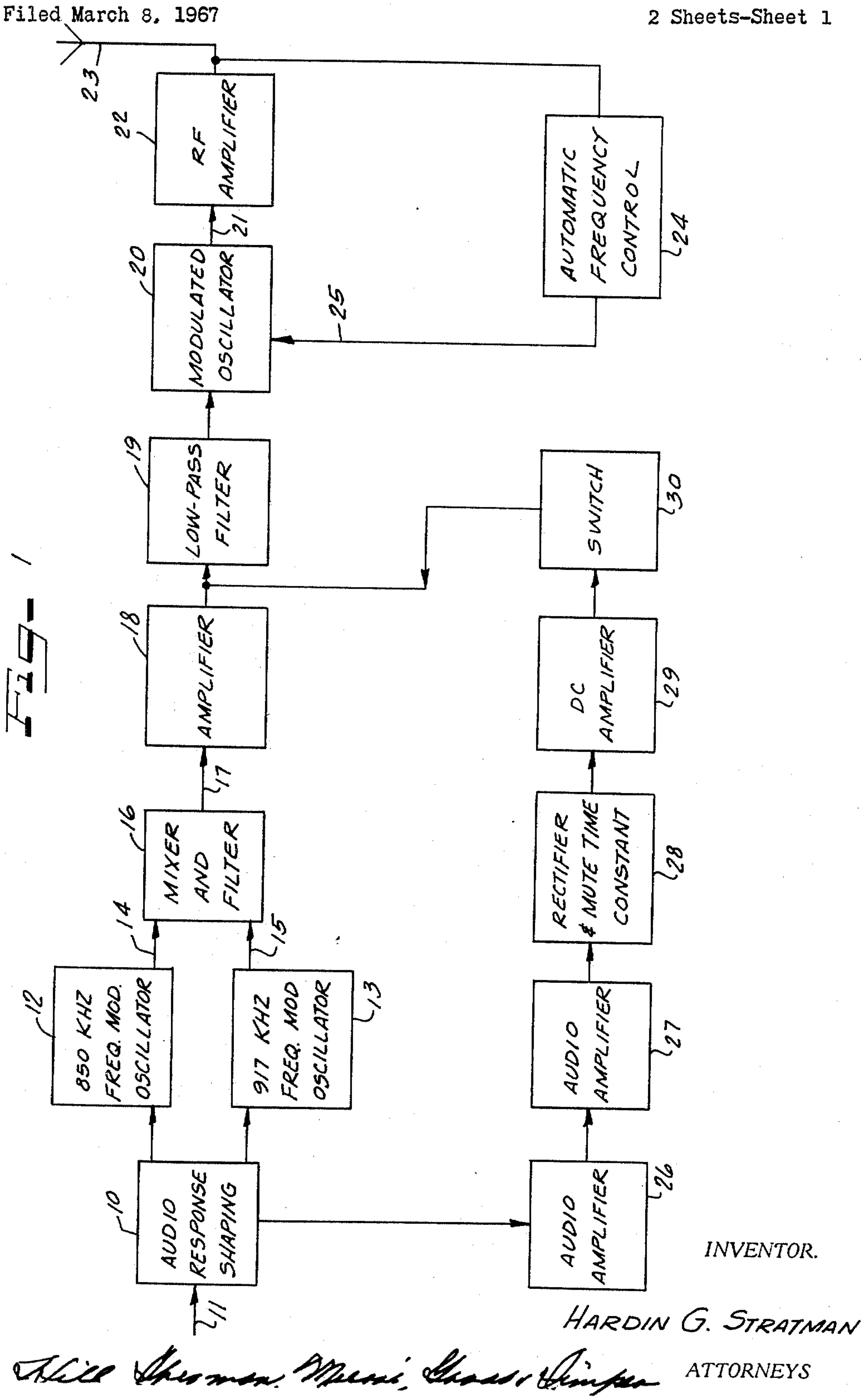
FIGURE 1 is a block diagram illustrating the functional operation of an FM exciter employing the features of the present invention.

The FM exciter shown in FIGURE 1 comprises an audio response shaping network 10 for receiving an audio signal at 11 and for providing some attenuation and impedance matching at the higher audio frequencies.

The audio response shaping circuit 10 couples the audio input signal to first and second high frequency modulation oscillators 12 and 13. In the preferred embodiment, the oscillator 12 is set at 850 kHz., while the oscillator 13 is set at 917 kHz. The result is that the audio signal modulates the two high frequency modulation oscillators, yielding two modulated high frequency signals at 14 and 15.

The two high frequency modulated signals at 14 and 15 are then fed to a mixer and filter network 16. In the mixer and filter network, sum and difference frequency signals are generated with the higher frequencies being removed by the filter, leaving only the lower or difference frequency signal at the output 17. The difference frequency signal at the output 17 is a 67 kHz. sub-carrier signal which is frequency modulated by the audio input signal.

The sub-carrier signal as developed at output 17 is connected to a standard amplifier 18 and through a low pass filter 19 to the main modulated oscillator 20 associated with the broadcast frequency of the network using the FM exciter of this invention. The output of the modulated oscillator as at 21 is connected to an RF amplifier 22 and delivered to an antenna 23 for broadcasting.

The output signal is provided with an automatic frequency control 24 which is fed back to the modulated oscillator as at 25 to maintain the stability of the broadcast frequency.

To eliminate crosstalk from the main channel to the sub-channel when no audio on the sub-channel is present, a muting network is provided as shown in FIGURE 1. In particular, the muting network consists of an audio amplifier 26 which is connected to the audio response shaping network 10 and to a second amplifier 27. The second amplifier 27 is connected directly to a rectifier and mute time constant circuit 28 for sensing the level of the audio signal and for developing a control signal in response to a low level audio input. The circuit 28 is connected to a DC amplifier 29 and to a switch 30 which may be utilized to cut out the sub-channel signal and to prevent the sub-carrier from modulating the oscillator 20.

Figure 2:
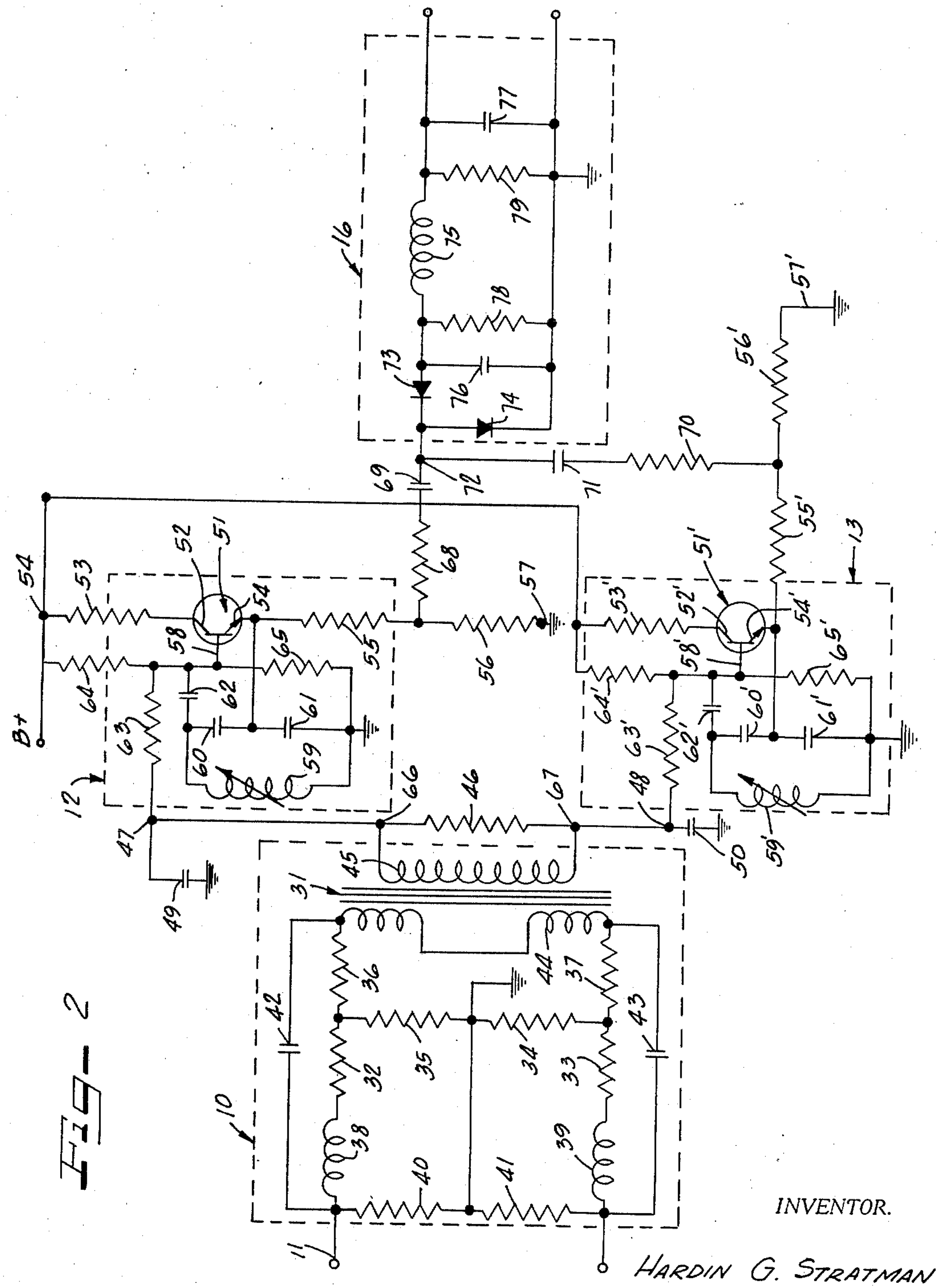
FIGURE 2 is a schematic diagram of a low frequency modulation network according to the present invention.

Referring to FIGURE 2, the audio signal is applied to the input or primary of a transformer 31 through an H pad consisting of resistors 32, 33, 34, 35, 36 and 37, which provides roughly 20 db of attenuation. In addition, inductors 38 and 39 together with further resistors 40 and 41 provide additional attenuation and impedance matching at the higher audio frequencies. Further shaping of the audio signal is accomplished through the use of capacitors 42 and 43. With the capacitors 42 and 43 connected as shown, the audio voltage appearing at the primary of the transformer 31 will increase several db at approximately 5–6 kHz., and then tend to decrease at higher frequencies. Generally, inductors 38 and 39 in conjunction with capacitors 42 and 43 tend to provide a more constant impedance to the audio input line.

The audio signal is fed to the primary 44 of the transformer 31 and to a secondary 45. The secondary 45 is terminated in a resistor 46 and connected in a push-pull manner to the oscillators 12 and 13 at junction points 47 and 48. Capacitors 49 and 50 are connected from the junction points 47 and 48 to ground for the purpose of isolating the oscillator frequency of the respective oscillators from the transformer 31.

In the preferred embodiment, two oscillators operating at a higher frequency than the final desired frequency are frequency modulated, and the difference frequency is used as the final sub-carrier output. Each of the two frequency modulated oscillators 12 and 13 comprise a basic Colpitts type oscillator circuit. In all respects, both electrically and physically the two oscillator circuits are identical. Under this condition, should the surrounding temperature change and cause the oscillators to drift from their set frequency, both oscillators would tend to drift the same amount and in the same direction in frequency. Therefore, the difference in frequency between the oscillators would remain substantially constant.

The oscillator 12 comprises a transistor 51 having a collector 52 connected through a resistor 53 to a DC voltage supply source at 54. The emitter 54 of the transistor 51 is connected through resistors 55 and 56 to ground potential at a point 57.

The transistor 51 has a base terminal 58 connected to a tank circuit consisting of an inductor 59 and capacitors 60 and 61. Some stray capacity is reflected from the transistor 51 across the oscillator tank circuit through a capacitor 62. The bias level for the transistor 51 is determined by resistors 55, 56, 63, 64 and 65. This bias level, as established by these resistors, ultimately determines the modulation capability and linearity of the oscillator circuit 12. The frequency of the oscillator circuit 12 may be changed by varying the base bias of the transistor 51. It is felt that this occurs because the base to collector junction of each silicon transistor is a reverse bias junction. Changing this voltage causes the junction to work in the fashion of a voltage variable capacitor.

It is apparent, therefore, that if an audio signal is applied to the base of the transistor 51, for instance, the output frequency of the oscillator 12 will vary in step with the applied audio bias.

This is accomplished in a push-pull fashion by the secondary of the transformer 31. When the audio voltage appearing at the top terminal, namely terminal 66 of the secondary 45, is increasing in a positive direction, the audio voltage will simultaneously be increasing in a negative direction at the bottom terminal, namely terminal 67 of the secondary 45. This causes the frequency of the oscillator 12 to be lowered, while at the same time the frequency of the oscillator 13 is being raised. The effect is that there is a doubling of the modulation capability as compared to that which would be available if only one oscillator circuit were being modulated.

Since the oscillator 13 is identical to the oscillator 12, a more detailed description of the oscillator 13 is not required and the primed reference numerals in oscillator 13 refer to corresponding elements of oscillator 12.

It will be understood that the outputs of the oscillators 12 and 13 will be high frequency signals modulated by the audio information signal as applied to the oscillators at the junction points 47 and 48 respectively. For instance, in the illustrative embodiment, the oscillator 12 is set to a center frequency of 850 kHz., while the oscillator 13 is set to a center frequency of 917 kHz. It is to be noted that the difference between these two established frequencies is exactly 67 kHz.

The two high frequency modulated signals from the oscillators 12 and 13 are applied to the junction of the mixer and filter network 16 through isolation resistors and capacitors 68, 69, 70 and 71 to a circuit junction point 72.

The combined oscillator output signals as received at the junction point 72 is applied to a crystal mixer consisting of diodes 73 and 74. As is understood, both oscillator frequencies appear at the output of diode 73 along with the sum of the two oscillator frequencies and the difference of the two frequencies. All but the difference of the two frequencies is removed from the circuit by a low pass filter comprising an inductor 75 and capacitors 76 and 77. This filter is terminated by the resistors 78 and 79, forming the approximate characteristic impedance of the filter.

The result is that the output of the circuit as shown in FIGURE 2 is a frequency modulated signal having a center frequency at 67 kHz., which is the desired subcarrier frequency level.

It is difficult to frequency modulate an oscillator circuit plus or minus 5 kHz., for instance, when operating at 67 kHz., without considerable distortion or non-linearity. In addition, the center frequency may drift considerably as the temperature varies over a wide range. However, in the illustrative embodiment, high frequency signals in the other of 900 kHz. are frequency modulated by the audio signal, and a difference signal is developed at 67 kHz. with a high degree of linearity and with a low degree of distortion. In addition, the center frequency is maintained at 67 kHz. and does not shift with changes in temperature. This is because changes in temperature will increase or decrease both the oscillators 12 and 13 in a similar manner, leaving the difference frequency unchanged.

It will be understood that various modifications and combinations of the features of the above described embodiment may be accomplished by those versed in the art, but I desired to claim all such modifications and combinations as properly come within the spirit and scope of my invention.

I claim:

1. A low frequency, modulation network comprising:
first circuit means for generating a first relatively high frequency signal,
second circuit means for generating a second relatively high frequency signal,
the frequency of said second signal being higher than the frequency of said first signal and the frequency difference between said first and second signals being relatively small in comparison to the frequency of said first and second signals,
a modulation signal means for modulating said first and second signals with the said modulation signal means, and
means for mixing the modulated outputs of said first and second circuit means and for developing a modulated frequency difference signal,
whereby an accurate low frequency modulated signal is obtained.

2. A low frequency modulation network in accordance with claim 1 wherein said modulation signal means is applied positively to said first circuit means to increase the frequency output thereof and simultaneously applied negatively to said second circuit means to decrease the frequency output thereof, whereby the difference frequency deviation is approximately twice the frequency deviation of one of said first and second circuit means.

3. A low frequency modulation network in accordance with claim 1 wherein the electrical and physical characteristics of said first and second circuit means are substantially identical such that changes in ambient temperature cause the output frequency of said first circuit means to drift substantially identically with the drift in output frequency of said second circuit means whereby the difference frequency is substantially unaffected by environmental changes ambient said first and second circuit means.

4. A low frequency modulation network comprising:
first and second oscillator circuits each having an output frequency dependent upon the magnitude of the drive signal applied thereto,
a drive circuit having means connected to each of said first and second oscillator circuits for applying a varying drive signal thereto,
said drive circuit being connected to said first and second oscillators in a push-pull manner wherein a positive-going portion of a drive signal is applied to one of said oscillators and a negative-going portion is simultaneously applied to the other of said oscillators, a signal mixer, means for connecting the outputs of said first and second oscillators to said signal mixer, and means for recovering the difference frequency signal generated by the combining of said first and second oscillator output signals at said mixer.

5. A low frequency modulation network in accordance with claim 4 wherein said first and second oscillators have substantially identical physical and electrical properties and wherein said signal mixer comprises a crystal mixer for generating a sum and a difference frequency signal component at the output thereof and wherein a low pass filter is connected to the output of said signal mixer to pass only the difference frequency signal thereof.

6. A low frequency modulation network in accordance with claim 4 wherein said first and second oscillators each include a transistor and wherein said push-pull drive circuit couples drive signals of opposite polarities to the base of each of said transistors for varying the frequency of said oscillators, whereby the frequency deviation of said difference frequency signal is substantially twice the magnitude of the frequency deviation of each of said first and second oscillators.

7. In an FM exciter, a low frequency modulation network comprising:

an audio driver circuit having an audio transformer at the output thereof, first and second oscillator circuits each having a given steady state frequency output, said audio transformer being connected in a push-pull manner to said first and second oscillators and applying an audio signal of a first polarity to said first oscillator and said audio signal having an opposite polarity to said second oscillator, means for mixing the first and second oscillator outputs and means for recovering the difference frequency from said mixer, said difference frequency being the sub-carrier frequency and being of a frequency level which is substantially less than the steady state frequency level of either of said first and second oscillators.

8. An FM exciter in accordance with claim 7 wherein said first and second oscillators are tuned to a frequency in the order of several hundred kHz. and wherein the difference between the steady state frequencies of said first and second oscillators is 67 kHz.

9. An FM exciter in accordance with claim 7 wherein said first and second oscillators are tuned to a frequency in the order of several hundred kHz. and wherein the difference between the steady state frequencies of said first and second oscillators is 41 kHz.

10. An FM exciter in accordance with claim 7 wherein said oscillators are frequency modulated oscillators and wherein said oscillators have substantially identical physical and electrical properties such that center frequency drift of each of said oscillators is substantially identical thereby maintaining a constant sub-carrier difference signal.

References Cited

UNITED STATES PATENTS 3,249,897 5/1966 Trilling ----------- 332—24 X

ROY LAKE, Primary Examiner

LAWRENCE J. DAHL, Assistant Examiner

U.S. Cl. X.R.

325—47